(12) United States Patent
Lee

(10) Patent No.: US 11,873,824 B2
(45) Date of Patent: Jan. 16, 2024

(54) BLOWER

(71) Applicant: TECHTRONIC CORDLESS GP, Anderson, SC (US)

(72) Inventor: Hei Man Lee, Kwai Chung (CN)

(73) Assignee: Techtronic Cordless GP, Anderson, SC (US)

(*) Notice: Subject to any disclaimer, the term of this patent is extended or adjusted under 35 U.S.C. 154(b) by 0 days.

(21) Appl. No.: 17/592,224

(22) Filed: Feb. 3, 2022

(65) Prior Publication Data

US 2022/0252076 A1    Aug. 11, 2022

(30) Foreign Application Priority Data

Feb. 5, 2021    (CN) .......................... 202110162588.0

(51) Int. Cl.
| | | |
|---|---|---|
| *F04D 25/06* | (2006.01) | |
| *F04D 29/40* | (2006.01) | |
| *F04D 29/58* | (2006.01) | |
| *A01G 20/47* | (2018.01) | |

(52) U.S. Cl.
CPC ........... *F04D 25/06* (2013.01); *F04D 29/403* (2013.01); *F04D 29/582* (2013.01); *F04D 29/5813* (2013.01); *A01G 20/47* (2018.02)

(58) Field of Classification Search
CPC ........ A01G 20/47; F04D 25/06; F04D 29/646
See application file for complete search history.

(56) References Cited

U.S. PATENT DOCUMENTS

| | | |
|---|---|---|
| 4,659,951 A | 4/1987 | Angi |
| 6,006,400 A | 12/1999 | Presenza |
| 6,105,206 A | 8/2000 | Tokumaru |
| 7,554,227 B2 | 6/2009 | Horng |
| 7,994,669 B2 | 8/2011 | Lin |
| 8,084,901 B2 | 12/2011 | Oomori |
| 8,513,838 B2 | 8/2013 | Toukairin |
| 8,567,521 B2 | 10/2013 | Lau |
| 9,293,964 B2 | 3/2016 | Sakamaki |

(Continued)

FOREIGN PATENT DOCUMENTS

| | | |
|---|---|---|
| CN | 101064454 B | 10/2007 |
| CN | 101071964 B | 11/2007 |

(Continued)

OTHER PUBLICATIONS

US 10,848,032 B2, 11/2020, Doan (withdrawn)
European Search Report Corresponding with Application No. EP22151967 dated Jun. 24, 2022 (2 pages).

*Primary Examiner* — Thomas Fink

(74) *Attorney, Agent, or Firm* — Dority & Manning, P.A.

(57) ABSTRACT

A blower, comprising: a blower body, having accommodated therein a fan and a drive unit, a rotation shaft of the fan defining a longitudinal axis, and the blower body defining an air inlet; a blow pipe, attached to the blower body and extending along the longitudinal axis, the blow pipe defining an air outlet; and a control unit, for controlling operation of the drive unit. The blower defines an airflow path extending from the air inlet to the air outlet, the control unit being at least partially located in the airflow path, such that when the blower is operating, at least a portion of an airflow entering the air inlet cools the control unit and is then discharged through the air outlet.

18 Claims, 6 Drawing Sheets

(56) References Cited

U.S. PATENT DOCUMENTS

| | | |
|---|---|---|
| 9,366,262 B2 | 6/2016 | Oguma |
| 9,369,017 B2 | 6/2016 | Chien |
| 9,416,785 B2 | 8/2016 | Oguma |
| 9,525,326 B2 | 12/2016 | Chen |
| 9,859,772 B2 | 1/2018 | Bang |
| 10,113,562 B2 | 10/2018 | Pacilli |
| 10,232,502 B2 * | 3/2019 | Bylund .................. F04D 25/06 |
| 10,348,153 B2 | 7/2019 | Belanger |
| 10,348,158 B2 | 7/2019 | Niwa |
| 10,355,563 B2 | 7/2019 | Yu |
| 10,512,380 B2 | 12/2019 | Park |
| 10,680,498 B2 | 6/2020 | Li |
| 10,833,566 B2 | 11/2020 | Chang |
| 10,840,771 B2 | 11/2020 | Aso |
| 10,848,042 B2 | 11/2020 | Beyerl |
| 2001/0036409 A1 * | 11/2001 | Murata ..................... A47L 5/22 417/372 |
| 2010/0311318 A1 * | 12/2010 | Hause ................. A01K 1/0047 417/423.1 |
| 2011/0127862 A1 * | 6/2011 | Eichinger ............... H02K 3/24 310/61 |
| 2011/0273036 A1 | 11/2011 | Saur |
| 2014/0050600 A1 * | 2/2014 | Kodato ................. A01G 20/47 417/360 |
| 2016/0169249 A1 * | 6/2016 | Takahashi ........... F04D 25/0673 417/423.14 |
| 2017/0074286 A1 | 3/2017 | Kreidler |
| 2017/0141642 A1 | 5/2017 | Geissler |
| 2018/0209429 A1 | 7/2018 | Ishida |
| 2018/0274547 A1 | 9/2018 | Hofmann |
| 2018/0326568 A1 | 11/2018 | Fauteux |
| 2018/0338374 A1 | 11/2018 | Li |
| 2019/0003310 A1 * | 1/2019 | Chaki ..................... F01D 5/005 |
| 2019/0103784 A1 | 4/2019 | Kamada |
| 2019/0159640 A1 | 5/2019 | Hayamitsu |
| 2019/0165641 A1 | 5/2019 | Ito |
| 2019/0305633 A1 | 10/2019 | Yoneda |
| 2019/0305650 A1 | 10/2019 | Tanaka |
| 2019/0379258 A1 | 12/2019 | Hon |
| 2020/0016734 A1 | 1/2020 | Kelleher |
| 2020/0154962 A1 | 5/2020 | Fie |
| 2020/0177035 A1 | 6/2020 | Fukushima |
| 2020/0221913 A1 | 7/2020 | Shin |
| 2020/0227980 A1 | 7/2020 | Zou |

FOREIGN PATENT DOCUMENTS

| | | | |
|---|---|---|---|
| CN | 202926689 U | 5/2013 | |
| CN | 202929231 U | 6/2013 | |
| CN | 202985527 U | 6/2013 | |
| CN | 203313001 U | 11/2013 | |
| CN | 204669169 U | 9/2015 | |
| CN | 105822595 B | 8/2016 | |
| CN | 205545053 U | 8/2016 | |
| CN | 206442252 U | 8/2017 | |
| CN | 206815249 U | 12/2017 | |
| CN | 107725413 A | 2/2018 | |
| CN | 108626145 B | 10/2018 | |
| CN | 208930176 U | 6/2019 | |
| CN | 208950918 U | 6/2019 | |
| CN | 209244874 U | 8/2019 | |
| CN | 209354389 U | 9/2019 | |
| CN | 110425161 A | 11/2019 | |
| CN | 110620476 A | 12/2019 | |
| CN | 209733852 U | 12/2019 | |
| CN | 211449186 U | 9/2020 | |
| CN | 211474470 U | 9/2020 | |
| CN | 211648591 U | 10/2020 | |
| CN | 212129013 U | 12/2020 | |
| EP | 2132861 B1 | 12/2009 | |
| EP | 2615725 B1 | 7/2013 | |
| EP | 3648315 A1 | 5/2020 | |
| WO | WO-2015139723 A1 * | 9/2015 | ............. A01G 20/47 |
| WO | WO2016158154 A1 | 10/2016 | |
| WO | WO2019064897 A1 | 4/2019 | |
| WO | WO2020189226 A1 | 9/2020 | |
| WO | WO2020208790 A1 | 10/2020 | |

* cited by examiner

BLOWER

This application claims the benefit of priority to Chinese Patent Application No. 202110162588.0, filed on Feb. 5, 2021, the disclosure of which is incorporated by reference herein in its entirety.

TECHNICAL FIELD

The present invention relates to a blower, in particular to a blower for gardening work.

BACKGROUND ART

Leaf blowers are mainly used for blowing away fallen leaves, road surface dust, accumulated water and accumulated snow, etc. Common types of blower include petrol blowers and electric blowers. During operation, a petrol blower is powered by a petrol engine; fan blades rotate inside a fan volute, producing a wind which blows out through an air outlet to perform a job. In contrast to a petrol blower, an electric blower in which the fan is driven to rotate by a motor is small in volume, light in weight and convenient to operate, and is therefore popular among consumers.

When an electric blower is operating, electronic components on a circuit board for controlling the motor generate heat, causing a rapid increase in the temperature of the circuit board and its surroundings. The electronic components will fail due to overheating if this heat is not promptly dissipated. To prevent the electronic components from being damaged by heat, a cooling mechanism needs to be provided for the circuit board. A conventional cooling mechanism comprises a heat sink mounted on the circuit board and an independent air channel for cooling, enabling external air to carry away heat from the circuit board and the heat sink. However, the heat sink increases the weight of the blower, and it is difficult to ensure that a sufficient quantity of cooling air enters the independent air channel.

SUMMARY OF THE INVENTION

To overcome the above deficiencies, the present invention provides a blower, which utilizes a working airflow generated by the fan when rotating to cool the circuit board. The blower comprises: a blower body, having accommodated therein a fan and a drive unit, a rotation shaft of the fan defining a longitudinal axis, and the blower body defining an air inlet; a blow pipe, attached to the blower body and extending along the longitudinal axis, the blow pipe defining an air outlet; a control unit, for controlling operation of the drive unit, wherein the blower defines an airflow path extending from the air inlet to the air outlet, the control unit being at least partially located in the airflow path, such that when the blower is operating, at least a portion of an airflow entering the air inlet cools the control unit and is then discharged through the air outlet.

In one embodiment, the control unit is arranged close to the drive unit. Preferably, the control unit is substantially transverse to the longitudinal axis.

In one embodiment, the drive unit comprises a motor, and the control unit comprises a control circuit board located at an end of the motor. Preferably, in an airflow direction, one of the control circuit board and the fan is located downstream of the motor while the other is located upstream of the motor.

In one embodiment, the blower body comprises a casing in which the fan, motor and control circuit board are located.

Preferably, the casing comprises a hollow tapered flow-guiding body, with an opening formed in a surface and/or an extremity of the tapered flow-guiding body. More preferably, multiple openings spaced apart circumferentially are formed in the surface of the tapered flow-guiding body, each of the openings being enclosed by two arcs and two sides, the two arcs being arc sections on two circles of different radii centered at the center of the extremity of the tapered flow-guiding body.

In one embodiment, the blower body comprises a guard defining the air inlet, and in the direction of the longitudinal axis, the ratio of a distance between the control circuit board and the air inlet and a distance between the control circuit board and the air outlet is 0.7-1.3.

In one embodiment, the motor is a brushless DC motor controlled in a sensorless fashion, and no heat sink is present on the control circuit board.

In one embodiment, the casing comprises an outer ring and an inner ring, the tapered flow-guiding body being connected to the inner ring, and the control circuit board being located in a space defined by the tapered flow-guiding body and the inner ring. Preferably, at least a part of the tapered flow-guiding body protrudes beyond the outer ring, with the opening being formed in said at least one part.

In one embodiment, the tapered flow-guiding body further comprises a wing part, the wing part having an inner wall, an outer wall located at a radially outer side of the inner wall, and a connecting part which connects the inner wall to the outer wall; and an inner ring slot and an outer ring slot which mate with the inner wall and the outer wall are formed in the inner ring and the outer ring of the casing respectively. Preferably, a part of the inner ring slot that is not occupied by the inner wall forms an inner ring hole, the control circuit board being located downstream of the inner ring hole.

In one embodiment, a cross section of the control circuit board corresponds to a cross section of the motor. Preferably, the ratio of a cross-sectional area of the control circuit board to a cross-sectional area of a motor housing is 0.7-1.5, more preferably 0.9-1.1.

In one embodiment, the ratio of a cross-sectional area of the control circuit board to an area enclosed by the inner ring is 0.5-0.9, preferably 0.7-0.9. The ratio of the cross-sectional area of the control circuit board to an area enclosed by the outer ring is 0.3-0.7, preferably 0.4-0.6.

In one embodiment, the control circuit board is connected to a motor housing by means of a fastener, and at least a part of the motor is not covered by the motor housing.

In one embodiment, the motor housing comprises a first housing part located at one end of the motor and a second housing part located at the other end of the motor, the control circuit board being fixed to the second housing part, and the second housing part comprising a bottom wall and a sidewall; a first set of fastener holes is formed in the sidewall, a second set of fastener holes is formed in the bottom wall, and at least one opening leading to the interior of the motor is formed in the sidewall.

In one embodiment, the control circuit board has at least one through-hole and/or notch allowing an airflow to pass through the control circuit board.

DETAILED DESCRIPTION OF EMBODIMENTS

Figure 1:
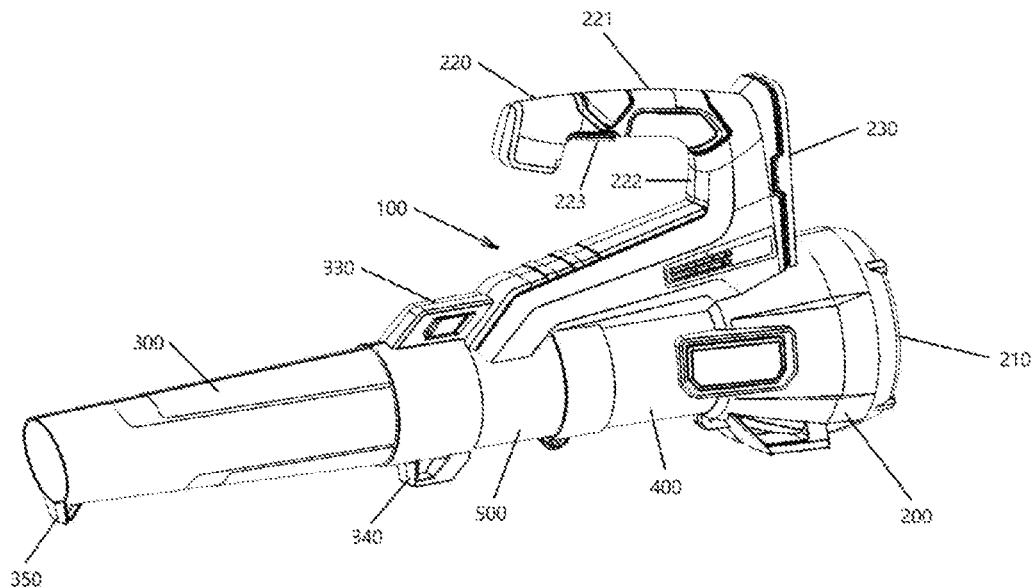
FIG. 1 shows a blower according to an embodiment of the present invention.

FIG. 1 shows a blower according to an embodiment of the present invention; the blower is an axial-flow blower, and comprises a blower body 100 and a blow pipe 300 mounted on the blower body 100. A fan, and a drive unit driving the fan to rotate, are accommodated in the blower body 100. In a state of not being used, a user can remove the blow pipe 300 from the blower body 100 to reduce storage space. The blower defines an airflow path from an air inlet to an air outlet. The air inlet is formed on the blower body 100, while the air outlet is formed on the blow pipe 300. To facilitate description, in this text, a straight line on which a rotation shaft of the fan in the blower lies is defined as a longitudinal axis, a side facing toward the air outlet is called a far side, and a side facing toward the air inlet is called a near side. In this embodiment, the blow pipe 300 is connected to the blower body 100 via a snap-fit connector 330 located at the near side thereof. It should be understood that other forms of dismantlable connection are also feasible, and are included in the scope of the present invention.

The blower body 100 comprises a body housing 200 and a casing that defines the airflow path. The body housing 200 may consist of two housing halves, to facilitate dismantling. The casing comprises an air-intake-side casing 400 and an air-output-side casing 500. A guard 210 is attached to a near-side part of the body housing 200, and defines the air inlet of the blower. A protective grille is formed on the guard 210 to prevent foreign objects from entering the body housing 200. Advantageously, the grille pattern is designed to help organize disordered external air into a smooth intake airflow.

The blower body 100 further comprises a handle 220. In the embodiment shown in FIG. 1, the handle 220 has a gripping part 221 for a user to grip, and a connecting part 222 that connects the gripping part 221 to the body housing 200. A control button 223 is provided on the gripping part 221, to enable the user to operate the blower with a single hand. In an embodiment which is not shown, the connecting part 222 is pivotably connected to the body housing 220, to allow the user to adjust the orientation of the handle 220 relative to the body housing 200.

The blower body 100 further comprises a battery pack installation mechanism 230, for attaching a removable battery pack (not shown in the figures). As battery technology develops, the capacity of battery packs is steadily increasing, and the weight thereof is also increasing accordingly. In this embodiment, the battery pack installation mechanism 230 is arranged on the connecting part 222 of the handle 220. This arrangement has the advantage that the battery pack is installed directly on the handle 220, closer to the gripping part 221, so the user is able to maintain the orientation of the blower steadily while holding the blower in the hand to perform a job. In other embodiments, the battery pack installation mechanism may be arranged at a lower part or a side of the body housing 200.

Figure 2:
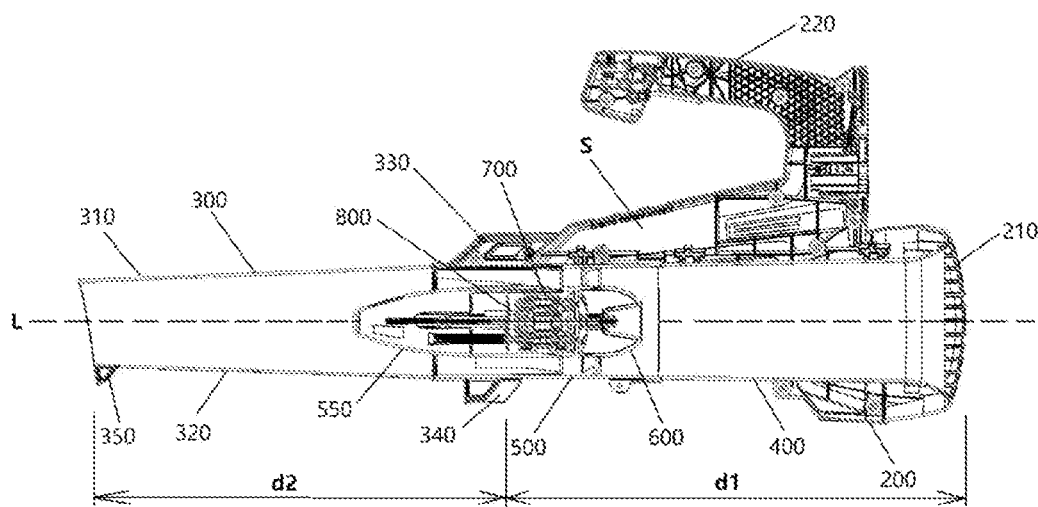
FIG. 2 shows a cross section of the blower according to an embodiment of the present invention.

FIG. 2 shows a cross section of the blower. External air enters the blower body 100 through the guard 210 under the driving action of the fan 600, flows sequentially through the air-intake-side casing 400, the air-output-side casing 500 and the blow pipe 300, finally exiting through the air outlet at a far end of the blow pipe 300. Viewed from one side, outer walls 310, 320 of the blow pipe 300 form an angle with respect to the longitudinal axis L. The angle is preferably less than 5 degrees, more preferably less than 2 degrees. Too large an angle results in a significant decrease in the area of an air delivery port, and this will increase the force of the airflow at the air delivery port excessively, possibly blowing up heavy objects undesirably, and will also exert high pressure on a blow pipe inner wall close to the air outlet. In this embodiment, the upper-side outer wall 310 of the blow pipe 300 extends a greater distance along the longitudinal axis L than the lower-side outer wall 320. A bottom support 340 is provided at a near-side part of the blow pipe 300, allowing the blower to be placed stably on the ground, and preventing wear to a blow pipe outer surface. Optionally, a protrusion 350 is provided at the bottom of a far-end edge of the blow pipe; when the blow pipe is placed on its own, the bottom support 340 and the protrusion 350 can support the blow pipe 300 stably.

In existing blowers, a control unit for controlling fan rotation is generally arranged outside the airflow path, e.g. in the handle 220 or in a connection part S of the handle 220 and the body housing 200. The control unit must be provided with a means of cooling, because electronic components in the control unit generate heat when the blower is operating. In general, the means of cooling includes providing a metal heat sink on the control unit, and at the same time forming a ventilation port on the body housing close to the control unit. However, the metal heat sink is heavy and will be a burden on the user. In environments where there is no wind or only gentle wind, the amount of air entering the housing through the ventilation port is limited, and is unable to rapidly carry away heat from the metal heat sink.

To overcome the above shortcomings, in the blower shown in FIG. 2, a control circuit board 800 used as the control unit is arranged in the airflow path, and the control unit is cooled by an airflow generated by the fan 600 when rotating. The control circuit board 800 may be arranged close to a motor 700 of the drive unit, e.g. at an end of the motor 700. In the embodiment of FIG. 2, in the airflow direction, the control circuit board 800 is located downstream of the motor 700, while the fan 600 is located upstream of the motor 700. In other embodiments, the control circuit board 800 is located upstream of the motor 700, while the fan 600 is located downstream of the motor 700. In the direction of the longitudinal axis L, the control circuit board 800 is located substantially in a middle section of the overall length of the blower. Preferably, the ratio d1/d2 of a distance d1 between the control circuit board 800 and the air inlet defined by the guard 210, and a distance d2 between the control circuit board 800 and the air outlet defined by the blow pipe 300, is 0.7-1.3.

Figure 3:
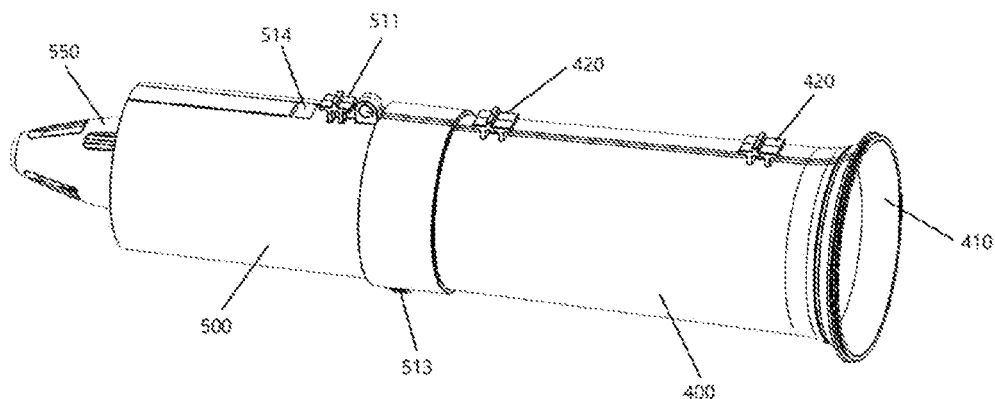
FIG. 3 shows a casing which defines an airflow path in the blower according to an embodiment of the present invention.

FIG. 3 shows the air-intake-side casing 400 and the air-output-side casing 500 which define the airflow path in the blower body 100. A near end of the air-intake-side casing 400 is connected to the guard 210, while a far end of the air-output-side casing 500 is connected to the blow pipe 300. To expand an air intake region and maintain airflow speed, a near-side part 410 of the air-intake-side casing 400 is designed to gradually open outward in the near-side direction. The air-intake-side casing 40 is substantially cylindrical, and comprises at least one positioning member 420. The positioning member 420 may be formed on an outer wall of the air-intake-side casing 400; the positioning member 420 engages with a positioning member formed at a corresponding position on the body housing 200, to ensure that the air-intake-side casing 400 is installed at a predetermined position of the blower body 100. Similarly, a positioning member 511 is also provided on an outer wall of the air-output-side casing 500, and likewise engages with a positioning member formed at a corresponding position on the body housing.

In the embodiment shown in FIG. 1, at least a part of the air-output-side casing 500 and the air-intake-side casing 400 is exposed to the outside environment. In an embodiment which is not shown, the air-intake-side casing 400 and the air-output-side casing 500 are located inside the body housing 200, with neither being exposed to the outside environment. An elastic positioning member may be provided on the outer wall of the air-intake-side casing 400 and/or the air-output-side casing 500. The thickness of the elastic positioning member is slightly greater than a distance between a casing outer wall and a body housing inner wall, such that the elastic positioning member is squeezed between the casing outer wall and the body housing inner wall, thereby positioning the casing in the body housing in a centered fashion, to resist vibration and reduce noise.

Figure 4A:
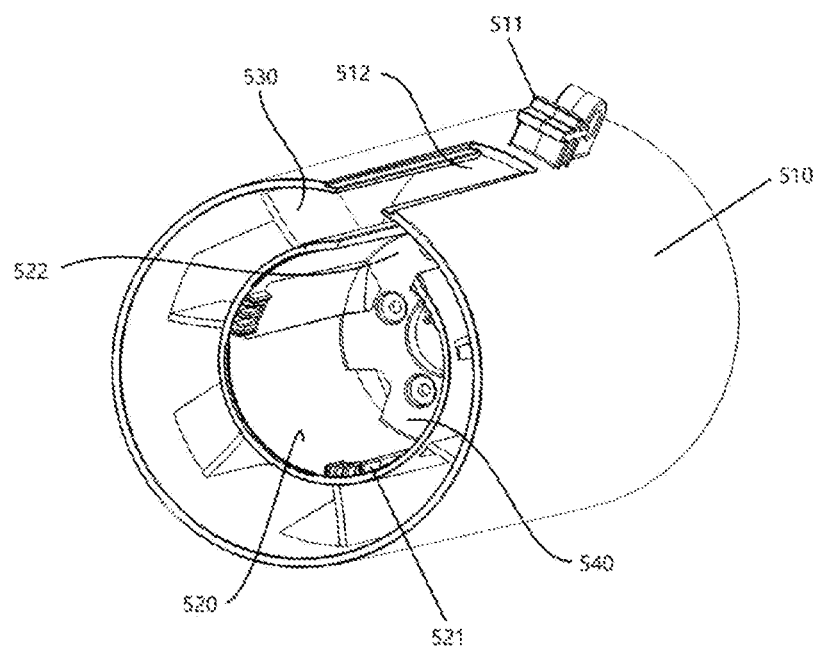
FIG. 4A shows one side of an air-output-side casing in the blower according to an embodiment of the present invention.
Figure 4B:
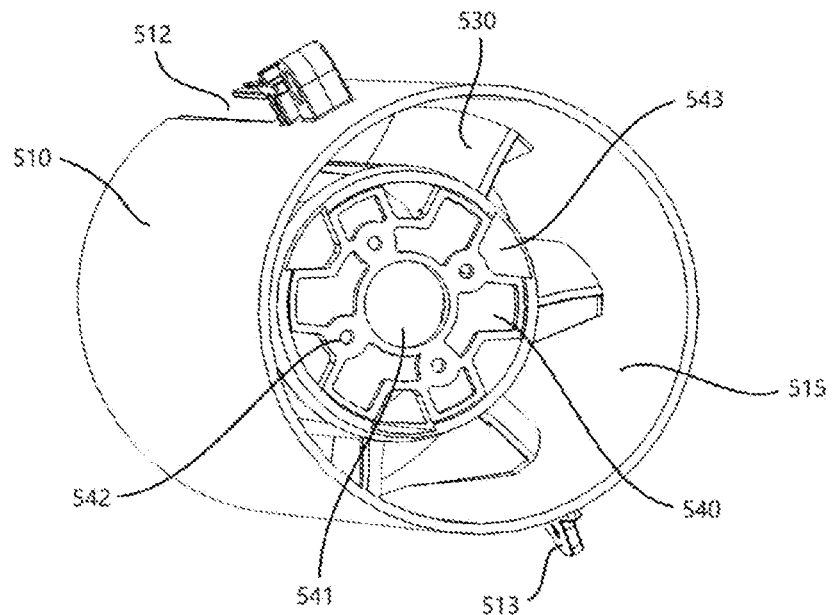
FIG. 4B shows the other side of the air-output-side casing in the blower according to an embodiment of the present invention.

FIGS. 4A and 4B show the structure of the air-output-side casing 500. The air-output-side casing 500 comprises an outer ring 510 formed of an outer wall, and an inner ring 520 located inside the outer ring 510. The outer ring 510 is connected to the inner ring 520 via multiple static vanes 530. The multiple static vanes 530 are spaced apart circumferentially, and used to guide airflow. The inner ring 520 defines a motor casing, with a motor assembly accommodated therein. A far end of the inner ring 520 is open, while a near end thereof has a motor mounting frame 540. FIG. 4B shows that the motor mounting frame 540 has a central hole 541, for a motor shaft to pass through. At least one fastener hole 542 is formed in the motor mounting frame 540; a fastener (e.g. a screw) can pass through the fastener hole 542 to fix the motor to the motor mounting frame 540. Optionally, an opening 543 is formed at the periphery of the motor mounting frame 540, and connects the interior of the motor casing with the outside, allowing air to enter or exit the motor casing. A protruding piece 513 is also provided on the outer wall of the air-output-side casing 500; a hole in the protruding piece 513 is used to receive a fastener which fixes the air-intake-side casing 400 to the air-output-side casing 500.

Figure 5:
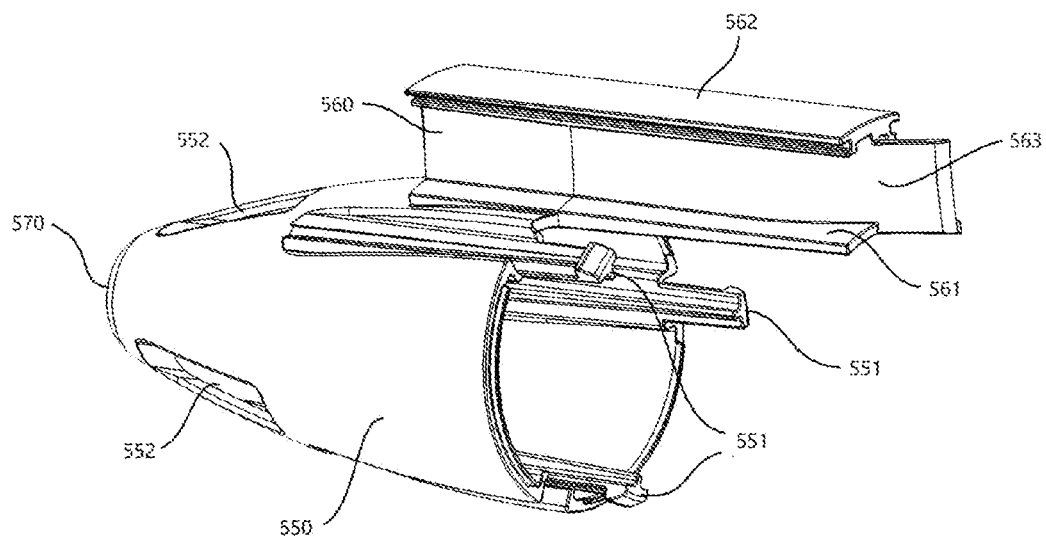
FIG. 5 shows a tapered flow-guiding body in the blower according to an embodiment of the present invention.

The air-output-side casing 500 comprises a tapered flow-guiding body 550 which narrows gradually toward the far side. FIG. 5 shows the tapered flow-guiding body, which is hollow and comprises at least one connector 551 extending toward a near end. The connector 551 in this embodiment is a hook-like member, and is mated with a connector 521 formed at the near side of the inner ring 520, to achieve a fixed connection between the tapered flow-guiding body 550 and the inner ring 520. It should be understood that the tapered flow-guiding body 550 and the inner ring 520 may be connected in any way, or the tapered flow-guiding body 550 and the inner ring 520 are integrally formed. At least one opening 552 is formed in an outer surface of the tapered flow-guiding body 550, and connects the interior of the tapered flow-guiding body 550 to the outside, allowing air to enter or exit the tapered flow-guiding body.

The tapered flow-guiding body 550 further comprises a wing part 560. The wing part 560 has an inner wall 561, an outer wall 562 located at a radially outer side of the inner wall 561, and a connecting piece 563 which connects the inner wall 561 to the outer wall 562. The inner ring 520 and outer ring 510 of the air-output-side casing 500 shown in FIG. 4A are not completely closed circumferentially, having an inner ring slot 522 and an outer ring slot 512 respectively. When assembly is complete, the inner wall 561 and outer wall 562 of the wing part 560 enter the inner ring slot 522 and outer ring slot 512 respectively, and the connecting piece 560 is used as a static vane between the outer ring 510 and the inner ring 520.

Figure 6:
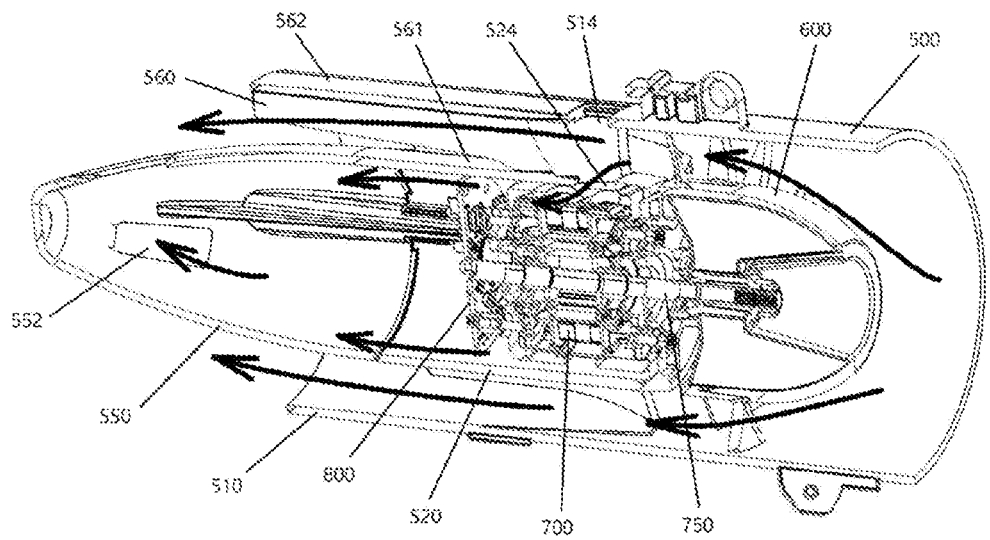
FIG. 6 shows a cross section of the air-output-side casing in the blower according to an embodiment of the present invention.

FIG. 6 shows a cross section of the air-output-side casing 500, with the motor assembly and fan 600 accommodated therein. The motor assembly comprises the motor 700, and the control circuit board 800 for controlling the operation of the motor. The motor assembly is positioned in the motor casing defined by the inner ring 520. The fan 600 is located outside the motor casing and at the near side of the motor 700; and the fan 600 is mounted on an output shaft 750 of the motor 700. In this embodiment, at least a part of the tapered flow-guiding body 550 protrudes beyond the outer ring 510, with the opening 552 being formed in part of the protruding part. A near-end edge of the tapered flow-guiding body 550 is aligned with a far-end edge of the inner ring 520; when connected together, the tapered flow-guiding body 550 and the inner ring 520 define a bullet-shaped internal space. It must be explained that although the control circuit board 800 shown in FIG. 6 is located in the inner ring 520, the control circuit board 800 may also be arranged at other positions in the internal space.

Figure 7:
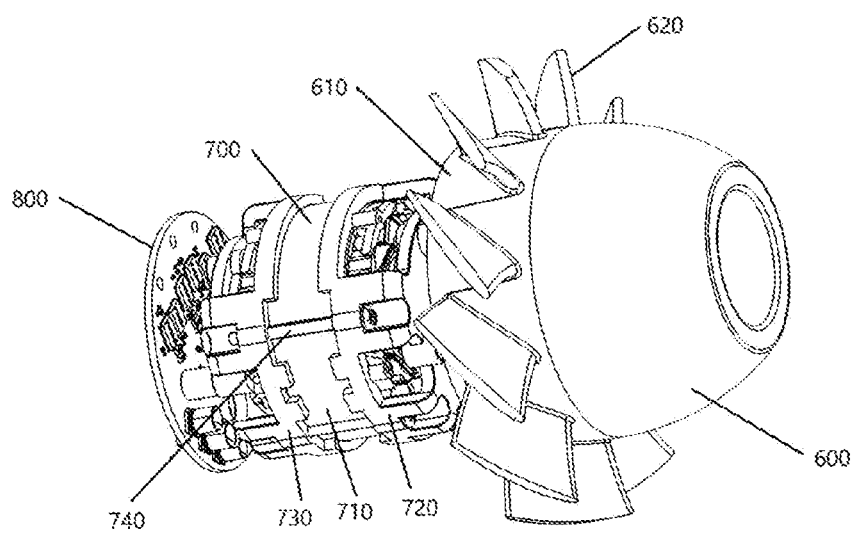
FIG. 7 shows a fan and a motor assembly in the blower according to an embodiment of the present invention.

FIG. 7 shows the fan and the motor assembly. The fan 600 comprises a hub 610, and blades 620 extending radially outward from the hub 610. The hub 610 is substantially aligned with the inner ring 520 of the air-output-side casing 500 in the axial direction. A gap between an extremity of the blade 620 and an inner wall 515 (shown in FIG. 4B) of the outer ring 510 of the air-output-side casing 500 is preferably 0.5-2.5 mm, and more preferably 0.8-1.5 mm. Too small a gap might result in the blade scraping the casing inner wall; too large a gap would increase noise, and reduce blowing efficiency. The control circuit board 800 in the motor assembly is located at the near side of the motor 700. In this embodiment, the motor 700 is an internal rotor motor; a housing of the motor 700 comprises a first housing part 720 and a second housing part 730, and the control circuit board 800 is connected to the second housing part 730 in a fixed manner.

Figure 8A:
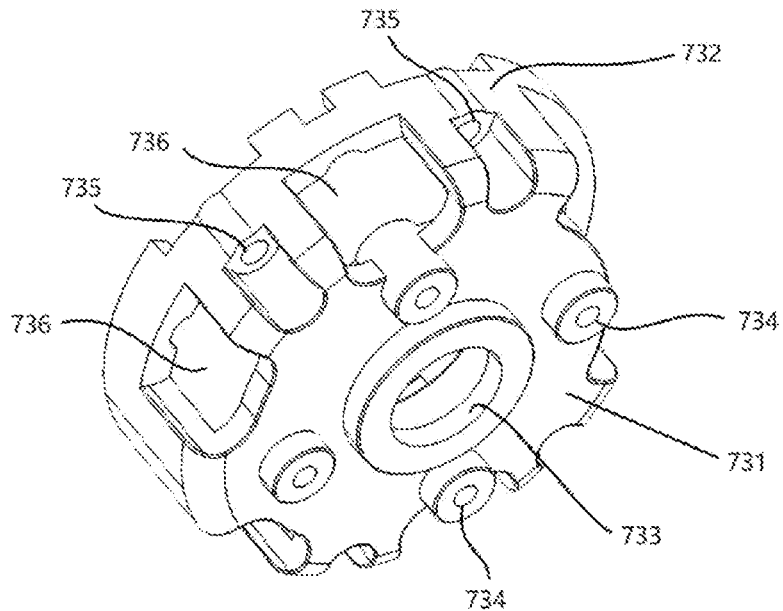
FIG. 8A shows one side of a motor housing part in the blower according to an embodiment of the present invention.
Figure 8B:
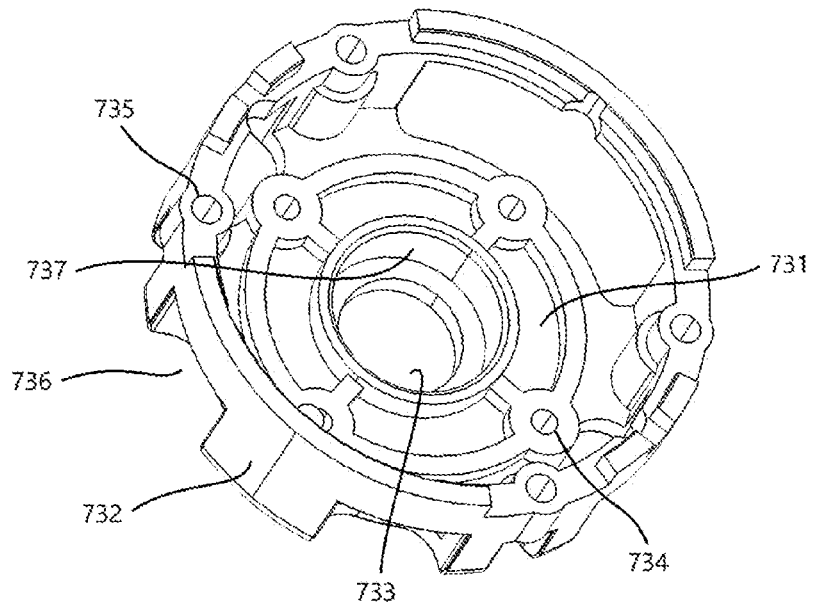
FIG. 8B shows the other side of a motor housing part in the blower according to an embodiment of the present invention.

FIGS. 8A and 8B show the structure of the second housing part 730. The second housing part 730 comprises a bottom wall 731 covering one end of the motor 700, and a sidewall 732 surrounding stator laminations 710. The second housing part 730 further comprises two sets of fastener holes. A first set of fastener holes 735 is formed in the sidewall 732, being aligned with fastener holes formed in a sidewall of the first housing part 720, and configured to receive fasteners 740 (shown in FIG. 7) for fixing the first and second housing parts 720, 730. A second set of fastener holes 734 is formed in the bottom wall 731, being configured to receive fasteners for fixing the control circuit board 800. In addition to the second set of fastener holes 734, a a cylindrical part 737 is also formed on the bottom wall 731, and configured to accommodate a motor bearing. A central through-hole 733 in the bottom wall 731 allows the motor shaft to pass through.

In the embodiment shown in FIG. 7, the first housing part 720 and second housing part 730 do not completely enclose the motor 700; a portion of the stator laminations 710 are not covered by the first housing part 720 and second housing part 730. The non-fully-enclosing motor housing makes it easy for air to come into contact with heat-generating components in the motor, thereby increasing the cooling efficiency. Optionally, at least one opening 736 is formed in the sidewall 732 of the second housing part 730.

The first housing part 720 may have substantially the same structure as the second housing part 730, including two sets of fastener holes formed on a sidewall and a bottom wall. The fastener holes in the bottom wall of the first housing part 720 are aligned with the fastener holes 542 (shown in FIG. 4B) formed in the motor mounting frame 540 of the air-output-side casing 500, and configured to receive fasteners for fixing the motor.

Figure 9:
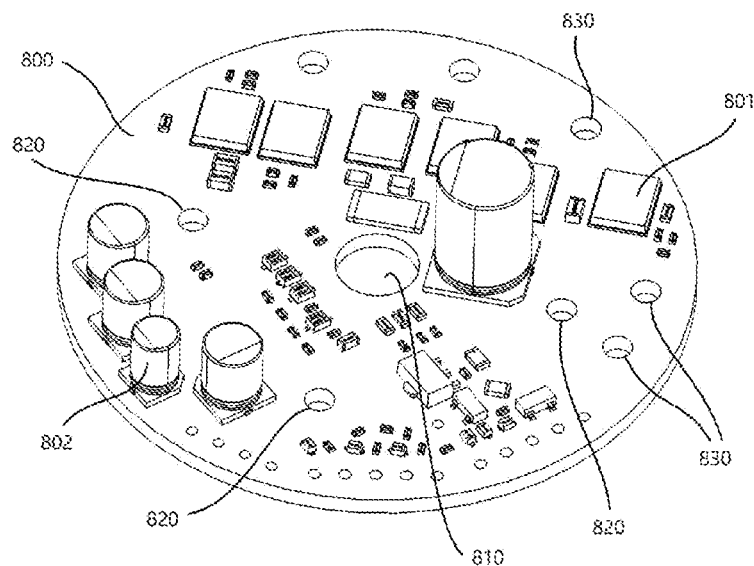
FIG. 9 shows a control circuit board in the blower according to an embodiment of the present invention.

FIG. 9 shows the control circuit board 800, on which are arranged various electronic components 801, 802 for controlling motor operation. Preferably, the shape of the control circuit board 800 corresponds to the cross-sectional shape of the motor housing. The ratio of the cross-sectional area of the control circuit board 800 to the cross-sectional area of the motor housing is 0.7-1.5, more preferably 0.9-1.1. Although a substantially round control circuit board is shown in the figure, control circuit boards of other shapes are also included in the scope of the present invention. Fastener holes 820 are formed in the control circuit board 800, being aligned with the second set of fastener holes 734 formed in the bottom wall 731 of the second housing part 730. Preferably, at least one through-hole is also formed in the control circuit board, e.g. a through-hole 810 located in the center and a through-hole 830 close to an edge, or a notch is formed in an edge of the control circuit board. These through-holes or notches allow air to pass through the control circuit board 800 and carry away heat generated by the electronic components during operation. In addition, the through-hole 810 located in the center may also accommodate the motor shaft.

Returning to FIG. 6, this shows flow paths of air when the blower is operating. An airflow passes through an annular region between the inner ring 520 and the outer ring 510 under the action of the fan, then exits the air-output-side casing 500 under the guiding action of the tapered flow-guiding body 550 and enters the blow pipe 300. In this embodiment, the inner wall 561 of the wing part 560 of the tapered flow-guiding body 550 does not completely occupy the inner ring slot 522 in the inner ring 520 of the air-output-side casing 500. The part of the inner ring slot 522 which is not occupied by the inner wall 561 forms an inner ring hole 524, which connects the annular region with the inner ring 520. Thus, when the blower is operating, a portion of the indrawn air enters the motor casing through the inner ring hole 524, and carries away heat generated by the motor components.

Similarly, the outer wall 562 of the wing part 560 does not completely occupy the outer ring slot 512 in the outer ring 510. The part of the outer ring slot 512 which is not occupied by the outer wall 562 forms an outer ring hole 514, which connects the air-output-side casing 500 with the body housing 200. Preferably, the outer ring hole 514 and inner ring hole 524 are aligned in a vertical direction. An electric wire connected to the control button on the handle 220 can pass through the outer ring hole 514 and inner ring hole 524 to reach the control circuit board 800.

Hereinbelow, the air which exits the air-output-side casing 500 through the annular region is referred to as a main air flow, while the air which enters the motor casing through the inner ring hole 524 is referred to as a cooling air flow, to make it easier to distinguish between the two. In order to make full use of the cooling air flow, the control circuit board 800 is positioned close to the motor 700, preferably downstream of the inner ring hole 524, so that the cooling air flow can also cool the control circuit board 800. Since the control circuit board 800 is located in the inner ring 520 of the air-output-side casing 500, it will not affect the main air flow.

As can be seen from FIG. 6, the control circuit board 800 is arranged substantially transversely to the longitudinal axis, i.e. transversely to the flow direction of the cooling air flow. This manner of arrangement increases the area of contact between the control circuit board 800 and the cooling air flow. Furthermore, due to the blocking action of the control circuit board 800, the cooling air flow is not able to exit the inner ring 520 rapidly, which increases the time of contact between the cooling air flow and the control circuit board 800. The ratio of the cross-sectional area of the control circuit board 800 to the area enclosed by the inner ring 520 is preferably 0.5-0.9, more preferably 0.7-0.9. The ratio of the cross-sectional area of the control circuit board 800 to the area enclosed by the outer ring 510 is 0.3-0.7, more preferably 0.4-0.6. As a new cooling air flow enters the inner ring 520, the original cooling air flow exits the inner ring 520 through the through-hole in the control circuit board 800 and a gap between the control circuit board 800 and the inner ring 520, and enters the tapered flow-guiding body 550.

Figure 10:
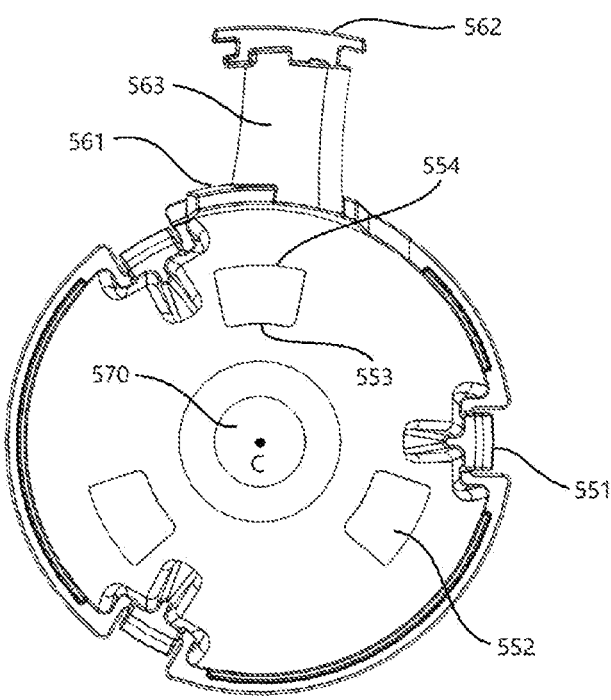
FIG. 10 shows an end face of the tapered flow-guiding body in the blower according to an embodiment of the present invention.

FIG. 10 is a view of an end face of the tapered flow-guiding body 550. Viewed in a direction from the near side to the far side, three openings 552 in the tapered flow-guiding body 550 are spaced apart circumferentially. Each opening 552 is enclosed by two arcs 553, 554 and two sides. The two arcs 553, 554 are arc sections on two circles of different radii centered at the center of an extremity 570 of the tapered flow-guiding body 550. The openings 552 enable the cooling air flow to rapidly enter the blow pipe 300 through the tapered flow-guiding body 550, thereby carrying away heat generated by the motor 700 and the control circuit board 800. It should be understood that the number, shape and manner of arrangement of the openings may be varied; for example, round or annular openings may be chosen. In other embodiments, an opening may also be formed at the extremity 570 of the tapered flow-guiding body. In view of the fact that the cooling air flow will mix with the main air flow after exiting the tapered flow-guiding body 550, the shape and arrangement of the openings should be designed in such a way that interference to the main air flow from the cooling air flow is avoided as much as possible. The manner of arrangement of the openings shown in FIG. 10 is able to achieve this result.

In particular, if the motor driving rotation of the fan is a brushless DC motor controlled in a sensorless fashion, then there is no need for a position sensor (e.g. a Hall sensor) for controlling motor commutation to be provided on the control circuit board. In the case of a blower which uses a brushless DC motor of this type, the working airflow generated by fan rotation can be used to effectively cool the control circuit board, thus there is no need for the control circuit board to be provided with a heat sink. This can reduce the weight of the blower, reducing the feeling of fatigue experienced by the user when working with the blower held in the hand for a long period of time. Since the control circuit board is located in the air channel, space for accommodating the control circuit board does not need to be left in the blower housing. This helps to optimize the housing design, reducing the overall size of the blower.

Although the present invention has been described in detail in conjunction with limited embodiments, it should be understood that the present invention is not limited to these disclosed embodiments. Those skilled in the art can envisage other embodiments that conform to the spirit and scope of the present invention, including changes in quantities of components, alterations, substitutions or equivalent arrangements, and all such embodiments shall fall within the scope of the present invention.

The invention claimed is:

1. A blower, comprising:
a blower body, having accommodated therein a fan and a drive unit comprising a motor, a rotation shaft of the fan defining a longitudinal axis, and the blower body defining an air inlet;
a blow pipe, attached to the blower body and extending along the longitudinal axis, the blow pipe defining an air outlet;
a control unit, for controlling operation of the drive unit, wherein the control unit comprises a control circuit board located at an end of the motor;
wherein the blower defines an airflow path extending from the air inlet to the air outlet, the control unit being at least partially located in the airflow path, such that when the blower is operating, at least a portion of an airflow entering the air inlet cools the control unit and is then discharged through the air outlet;
wherein the blower body comprises a casing in which the fan, motor, and control circuit board are located, the casing comprising an outer ring, an inner ring, and a hollow tapered flow-guiding body connected to the inner ring, the casing further comprising a static vane removably coupled between the inner ring and the outer ring,
wherein the tapered flow-guiding body comprises a wing part forming the static vane, the wing part having an inner wall, an outer wall located at a radially outer side of the inner wall, and a connecting part which connects the inner wall to the outer wall; and an inner ring slot and an outer ring slot which mate with the inner wall and the outer wall are formed in the inner ring and the outer ring of the casing respectively.

2. The blower as claimed in claim 1, wherein the control unit is arranged at an end of the drive unit, and is substantially transverse to the longitudinal axis.

3. The blower as claimed in claim 1, wherein in the airflow direction, one of the control circuit board and the fan is located downstream of the motor while the other is located upstream of the motor.

4. The blower as claimed in claim 1, wherein the hollow tapered flow-guiding body comprises an opening formed in a surface and/or an extremity of the tapered flow-guiding body.

5. The blower as claimed in claim 1, wherein the blower body comprises a guard defining the air inlet, and in the direction of the longitudinal axis, the ratio of a distance between the control circuit board and the air inlet and a distance between the control circuit board and the air outlet is 0.7-1.3.

6. The blower as claimed in claim 1, wherein the motor is a brushless DC motor controlled in a sensorless fashion, and no heat sink is present on the control circuit board.

7. The blower as claimed in claim 4, wherein the control circuit board is located in a space defined by the tapered flow-guiding body and the inner ring.

8. The blower as claimed in claim 7, wherein at least a part of the tapered flow-guiding body protrudes beyond the outer ring, with the opening being formed in said at least one part.

9. The blower as claimed in claim 1, wherein a part of the inner ring slot that is not occupied by the inner wall forms an inner ring hole, the control circuit board being located downstream of the inner ring hole.

10. The blower as claimed in claim 2, wherein a cross section of the control circuit board corresponds to a cross section of the motor, and the ratio of a cross-sectional area of the control circuit board to a cross-sectional area of a motor housing is 0.7-1.5.

11. The blower as claimed in claim 6, wherein the ratio of a cross-sectional area of the control circuit board to an area enclosed by the inner ring is 0.5-0.9, and the ratio of the cross-sectional area of the control circuit board to an area enclosed by the outer ring is 0.3-0.7.

12. The blower as claimed in claim 2, wherein the control circuit board is connected to a motor housing by means of a fastener, and at least a part of the motor is not covered by the motor housing.

13. The blower as claimed in claim 12, wherein the motor housing comprises a first housing part located at one end of the motor and a second housing part located at the other end of the motor, the control circuit board being fixed to the second housing part, and the second housing part comprising a bottom wall and a sidewall; a first set of fastener holes is formed in the sidewall, a second set of fastener holes is formed in the bottom wall, and at least one opening leading to the interior of the motor is formed in the sidewall.

14. The blower as claimed in claim 2, wherein the control circuit board has at least one through-hole and/or notch allowing an airflow to pass through the control circuit board.

15. The blower as claimed in claim 11, wherein the ratio of a cross-sectional area of the control circuit board to the area enclosed by the inner ring is 0.7-0.9.

16. The blower as claimed in claim 11, wherein the ratio of the cross-sectional area of the control circuit board to the area enclosed by the outer ring is 0.4-0.6.

17. The blower as claimed in claim 4, wherein multiple openings spaced apart circumferentially are formed in the surface of the tapered flow-guiding body, each of the openings being enclosed by two arcs and two sides, the two arcs being arc sections on two circles of different radii centered at the center of the extremity of the tapered flow-guiding body.

18. The blower as claimed in claim 10, wherein the ratio of a cross-sectional area of the control circuit board to a cross-sectional area of a motor housing is 0.9-1.1.

\* \* \* \* \*